US010448567B2

(12) United States Patent
Walch et al.

(10) Patent No.: US 10,448,567 B2
(45) Date of Patent: Oct. 22, 2019

(54) CUTTING MACHINE INCLUDING AN IMPROVED ARTICULATION MECHANISM

(71) Applicant: KUHN S.A., Saverne (FR)

(72) Inventors: Martin Walch, Dettwiller (FR);
Philippe Mayeur, Barchain (FR);
Michel Wolff, Waltenheim sur Zorn (FR)

(73) Assignee: KUHN S.A., Saverne (FR)

( * ) Notice: Subject to any disclaimer, the term of this patent is extended or adjusted under 35 U.S.C. 154(b) by 150 days.

(21) Appl. No.: 15/616,963

(22) Filed: Jun. 8, 2017

(65) Prior Publication Data
US 2017/0354077 A1 Dec. 14, 2017

(30) Foreign Application Priority Data

Jun. 10, 2016 (FR) ...................................... 16 55361

(51) Int. Cl.
*A01D 34/66* (2006.01)
*A01B 73/04* (2006.01)
*A01D 34/86* (2006.01)

(52) U.S. Cl.
CPC .......... *A01D 34/661* (2013.01); *A01B 73/042* (2013.01); *A01D 34/866* (2013.01)

(58) Field of Classification Search
CPC .. A01B 73/042; A01D 34/661; A01D 34/866; A01D 34/84; A01D 34/86
USPC ........................................................ 56/15.2
See application file for complete search history.

(56) References Cited

U.S. PATENT DOCUMENTS

| 2,861,409 | A | * | 11/1958 | Kosch ................... A01D 34/03 267/120 |
| 4,974,399 | A | | 12/1990 | Haberkorn |
| 5,040,360 | A | * | 8/1991 | Meehleder ............ A01D 34/27 56/11.6 |
| 5,782,071 | A | * | 7/1998 | Lehman ............... A01D 34/661 56/15.2 |
| 5,857,314 | A | * | 1/1999 | Wolff ................... A01D 34/661 56/15.8 |

(Continued)

FOREIGN PATENT DOCUMENTS

| DE | 195 34 695 A1 | 3/1997 |
| FR | 2 306 616 | 11/1976 |
| WO | WO 97/16957 A1 | 5/1997 |

OTHER PUBLICATIONS

French Preliminary Search Report dated Feb. 8, 2017 in French Application 16 55361, filed on Jun. 10, 2016 ( with English Translation of Categories of Cited Documents & Written Opinion).

*Primary Examiner* — Alicia Torres
*Assistant Examiner* — Adam J Behrens
(74) *Attorney, Agent, or Firm* — Oblon, McClelland, Maier & Neustadt, L.L.P.

(57) ABSTRACT

An agricultural machine comprising a connecting structure designed to be laterally mounted to a tractor, the connecting structure including a coupling support, a carrier beam and a transmission unit; the transmission unit including a driving pulley, a driven pulley, a transmission element drive-mounted on the driving and driven pulleys; a work unit articulated to the carrier beam via at least one folding axis, the work unit being fitted with at least one work tool configured to be driven in rotation from the transmission unit. In this machine, the folding axis and the rotation axis of the driven pulley are separate from each other.

12 Claims, 4 Drawing Sheets

(56) References Cited

U.S. PATENT DOCUMENTS

| | | | |
|---|---|---|---|
| 8,166,735 B1 * | 5/2012 | Schnell | A01D 34/661 56/228 |
| 2007/0130902 A1 * | 6/2007 | Murawski | A01D 34/661 56/14.9 |
| 2015/0189831 A1 * | 7/2015 | Wolff | A01D 34/661 56/255 |
| 2018/0317373 A1 * | 11/2018 | Nielsen | A01D 34/661 |

* cited by examiner

FIG. 9

CUTTING MACHINE INCLUDING AN IMPROVED ARTICULATION MECHANISM

BACKGROUND OF THE INVENTION

Field of the Invention

The present invention concerns mounted agricultural machines, such as mowers or roadside shredders, whose tool unit is positioned substantially vertically during transport.

Discussion of the Background

The document FR2306616 is known. This document describes a cutting machine fitted with a connecting structure and a mower unit mounted at the end of the connecting structure via a folding hinge.

The connecting structure includes a carrier beam and a transmission unit. The articulated chassis is mounted to the tractor hitch.

The transmission unit has a driving pulley and a driven pulley, as well as a transmission belt connecting the two pulleys.

SUMMARY OF THE INVENTION

The invention aims to propose an alternative, simplified and lighter cutting machine.

As such, the invention concerns an agricultural machine including:

a connecting structure designed to be laterally mounted to a tractor, the connecting structure including a coupling support, a carrier beam and a transmission unit;

the transmission unit including a driving pulley, a driven pulley, a transmission element drive-mounted on the driving and driven pulleys;

a work unit articulated to the carrier beam via at least one folding axis, the work unit being fitted with at least one work tool configured to be driven in rotation from the transmission unit.

The agricultural machine is noteworthy in that the folding axis and the rotation axis of the driven pulley are separate from each other.

Thanks to this specific feature, the stresses linked to the transmission and the stresses linked to folding are dissociated and spread across two separate elements. As such, it is possible to make certain parts lighter and limit the stacking thickness of the components on either the folding axis or the rotation axis of the driven pulley. A lighter machine is easier to manoeuvre.

Advantageously, the vertical plane passing through the centre of gravity G of the work unit lies in the space between the vertical planes passing through the rotation axis of the driving pulley and the folding axis when the agricultural machine is in a transport position. This feature gives the machine good stability during transport, while retracting it behind the tractor. As such, it is easy to comply with the transport width.

Advantageously, the vertical plane passing through the centre of gravity G of the work unit lies outside the space between the vertical planes passing through the rotation axis of the driving pulley and the folding axis when the agricultural machine is in a work position.

Advantageously, the distance between the rotation axes of the driving and driven pulleys is less in a transport position than in a work position and/or than in an intermediate position and/or the transmission element is slackened in the transport position of the agricultural machine. This protects the transmission element, notably if it is a belt, during transport and storage of the machine out of season when the work unit is left long-term in a raised storage position similar to the transport position. Furthermore, work on and the replacement of the transmission element are made easier. In addition, this feature is advantageous for safety, as the machine is prevented from operating outside of the desired operating angles.

Advantageously, the folding axis is situated below a plane passing through the rotation axes of the driving and driven pulleys in the work position.

Advantageously, a transmission element tensioning system is positioned in the space between the driving and driven pulleys and/or in the space defined by the transmission element. This enables the space inside the transmission element to be used advantageously. The tensioning system is concealed underneath the hood of the transmission unit. The volume of the connecting structure is therefore reduced compared with the existing structure. In addition, this configuration limits the cantilever effect on the pivot rods of the driving and driven pulleys. Furthermore, the integration of the tensioning system between the pulleys enables it to be used to cushion the lifting of the mower unit. This eliminates the need to include an additional device for cushioning the lifting of the mower unit.

Advantageously, the transmission element tensioning system includes a tensioning element that can be a compression spring, an elastomeric material and/or elastic pad and/or a cylinder. The transmission element tensioning system therefore also acts as a work unit unfolding support system and/or unfolding initiation system, even in an unfavourable inclined position.

Advantageously, the transmission element is a belt or a chain. In the case of a belt, slackening it during transport or storage ensures its longevity. A belt that is too slack risks slipping or sliding, with negative consequences on the cutting quality. A belt that is too slack can also wear prematurely. A correct belt tension prevents it from slipping or sliding. Furthermore, manual adjustment of the belt tension is imprecise regarding the value of the force set. Adjusting the tightening bolt does not determine—and therefore does not enable precise adjustment of—the value of the tension to which the belt is subject. Meanwhile, a belt tensioning system accurately determines the force applied on the pulley axes. As such, the tension to which the belt is subject can be more accurately determined.

Advantageously, the work unit is a mower unit or a roadside shredder.

BRIEF DESCRIPTION OF THE DRAWINGS

Other features and advantages of the invention will become clear from the following description, along with references to the attached drawings, which show non-exhaustive example embodiments of the hitching device according to the invention.

In these drawings.

DESCRIPTION OF THE PREFERRED EMBODIMENTS

In the following description, the notions "above", "below", "lower" and "upper" are defined relative to the ground, and the notions "front", "rear", "downstream", "left" and "right" are defined relative to the direction of advance A shown in FIG. 3.

Figure 1:
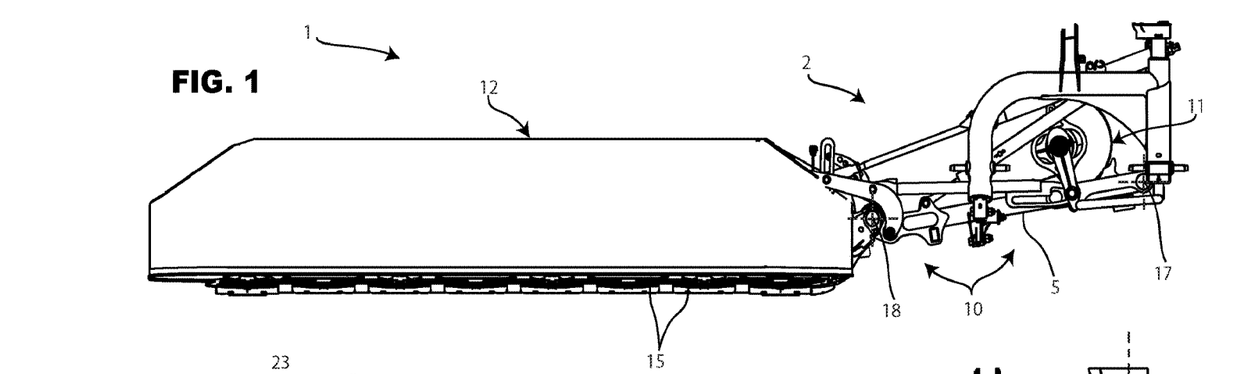
FIG. 1 is a front view of an agricultural machine in a work position that has a work unit, in this case a mower unit, and a connecting structure.

The agricultural machine 1 shown in FIG. 1 includes a connecting structure 2, a transmission unit 11 and a work unit 12.

The agricultural machine 1 allows at least three positions:

A work position in which the work unit 12 is nearby the ground and/or parallel to it.

A transport position in which the work unit 12 is raised vertically or a few degrees from vertical for road transport, preferably between 80 and 120 degrees from a horizontal work position.

An intermediate position between the two previous positions in which the work unit 12 is lifted off the ground without being completely raised as in a transport position.

When the machine 1 is a cutting machine, the intermediate position of the work unit 12 is for example a swath pass position.

The connecting structure 2 in particular includes a coupling support 3 and a strut 5. The connecting structure 2 also includes a lightening mechanism 8 (FIG. 3) and a folding mechanism 10 (FIG. 1).

The coupling support 3 can be mounted using trunnions 4a and an upper hitching element 4b (FIG. 4) on a three-point tractor hitch (tractor and three-point tractor hitch not shown here). The coupling support 3 is, for example, in the form of a machine-welded structure.

The strut 5, also called a carrier beam, is connected to the coupling support 3, preferably in an articulated manner or possibly in a rigid manner. In the production mode shown, the strut 5 is articulated relative to the coupling support 3 by means of a hinge 16 with a substantially vertical axis, but which could also be tilted forwards or backwards. During work, the strut 5 extends transversely, for example but not exclusively perpendicular, to the direction of advance A. In addition, the strut 5 is articulated relative to the coupling support 3 by a first folding hinge 17, here with a substantially horizontal axis 170, or a first folding axis. The axis 170 can alternatively be tilted by a few degrees relative to the horizontal. A limiter not detailed here acts as a stop to limit the stroke of the strut 5 around the axis 170 upwards and downwards. For example, not exclusively, the strut 5 is in the upper stop position in the position shown in FIG. 7.

The strut 5 has a first stop 49 and a second stop 50 called a cradle 50. The stops 49 and 50 are a single piece together with the rest of the strut 5, for example welded or formed as a body with the strut.

The lightening mechanism 8 in particular has an elastic element, also named tensioning element, in this case a tension spring 9 (FIGS. 3-4), the features of which enable it to limit the pressure on the ground of the work unit 12, for example on grass in the case of a cutting machine. The spring 9 can be replaced or supplemented with a cylinder, which can be autonomous or hydraulically controlled from the tractor.

Figure 2:
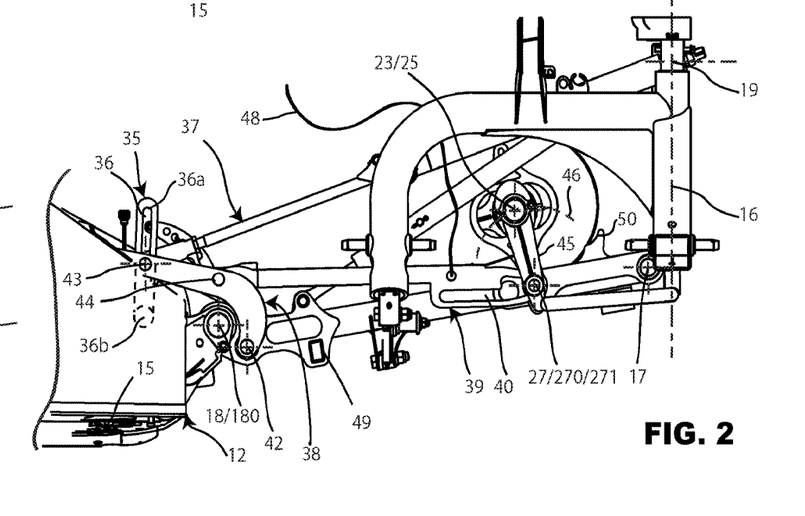
FIG. 2 is an enlargement of the connecting structure as shown in FIG. 1.

The folding mechanism 10 includes a lever 35, a lifting cylinder 37, a boomerang rod 38 and an adjustment rod in position 39 (FIG. 2).

The lever 35 has an oblong hole 36 with a bottom surface 36a forming a stop opposite the hitching point 36b of the lever on the intermediate beam 13 (FIG. 2).

The boomerang rod 38 is a curved part rotatably mounted on the strut 5 via a lower hinge 42. The rod 38 also includes an upper hinge 43 including a rod that can slide in the oblong hole 36.

The rod 38 can be raised by swivelling around its lower hinge 42 until it comes into contact with the stop 49.

The lifting cylinder 37 is in this case a single-acting cylinder. The cylinder 37 is mounted, on the coupling support side, on an upper axle 19 thanks to which it can swivel in a vertical plane (FIG. 2). The cylinder 37 is also connected to the boomerang rod 38 by the hinge 43. Activation of the cylinder 37 by the injection of oil allows it to be shortened.

A position adjusting device, which here is the rod 39, is also rotatably mounted on the boomerang rod 38 in a hinge 44, between the lower 42 and upper 43 hinges.

Figure 8:
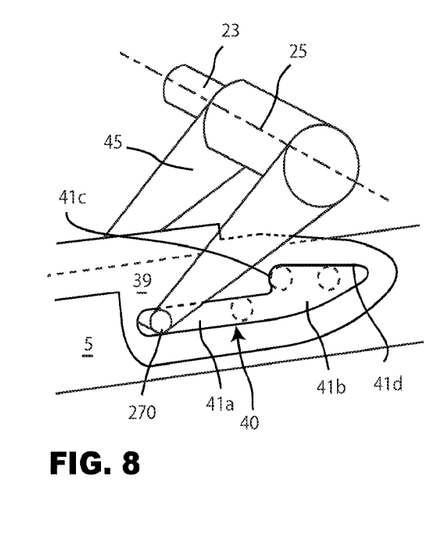
FIG. 8 is an enlargement of an adjustment rod end in position.

The rod 39 has a P-shaped elongated hole 40 (FIGS. 2 and 8). The hole 40 has an elongated passage 41a, a cavity 41b that is larger than the passage 41a, a transverse surface 41c and an upper surface 41d.

The surface 41c is part of the circumference of the cavity 41b and runs across the passage 41a. As described below, the surface 41c forms the swath pass stop, while the upper surface 41d acts as a cam profile.

An actuating control 48 is connected to the rod 39. In the example shown, this is a rope accessible from the cabin. It can also be a cable or an automated system. The actuating control 48 allows, when necessary, the rod 39 to be raised before changing the position of the machine 1.

The position adjusting device can take other forms than the rod 39, for example it can include a rod having an end surface forming a stop, a support secured to the strut 5, the rod resting on this support when the actuating control is at rest and sliding on the support when the work unit moves in a vertical plane.

The work unit 12 includes work tools 15 (FIG. 1). In the example shown in the figures, the work unit 12 is a mower unit and the tools are fitted in particular with blades for harvesting forage.

The work unit 12 in this case has an intermediate beam (FIG. 5) that can swivel vertically relative to the strut 5 around a second folding hinge 18, here with a substantially horizontal axis 180. The intermediate beam 13 serves for example as a hitching point for the cutter bar carrying the blades 15 and for a carrier structure 14.

The transmission unit 11 is a system responsible for driving the tools of the work unit 12 from a transmission shaft of the tractor.

Figure 5:
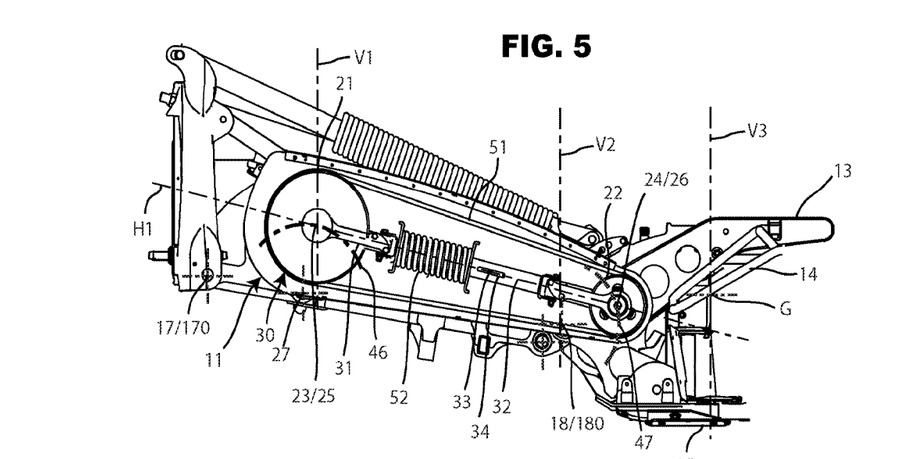
FIG. 5 is a partial view from the rear of the elements in FIG. 1, in a work position.

The transmission unit 11 includes a driving pulley 21 and a driven pulley 22, as well as a transmission element. The transmission element in this case is a transmission belt 51 connecting the two pulleys (FIG. 5). Alternatively, the transmission element is a chain.

The transmission unit 11 is also fitted with a transmission element tensioning system 30 including a tensioning element 52, a rod 31 and a sleeve 32 housing the rod 31 (FIG. 5). The rod 31 and the sleeve 32 can slide in a linear fashion relative to each other. The rod 31 and the sleeve 32 also have a restraining system, in this case respectively a pin 33 and a groove 34, preventing the catapulting of the rod 31 and the sleeve 32 under the effect of the tensioning element 52 when the transmission unit 11 is removed.

In the example shown in FIGS. 1 to 7, the tensioning element 52 is a compression spring. In a variant, the tensioning element can be different, for example it can include an elastomeric material and/or elastic pad such as polyurethane, a cylinder, which can be not exclusively single- or double-acting, spring or gas actuated, etc.

The driving pulley 21 is driven by a drive shaft 20 (FIG. 3), itself connected to a power take-off of the tractor by an intermediate shaft and a cardan joint system (not shown).

The driven pulley 22 transmits the driving force in the direction of the work unit.

The pulley 21 is mounted on a pivot 23 that can not only rotate around its own axis 25 but can also follow a circular arc trajectory 46 around a separate hinge 27 with an axis 271 parallel to the axis 25 (see FIG. 2). The pivot 23 is mounted in a U-shaped or bow-shaped bearing 45 the ends of which are positioned on either side of the strut 5. The pivot 23 can then follow a circular arc 46 trajectory centred on the axis 271. The bearing 45 can therefore be called a pivot bearing.

The hinge 27 includes a rod 270 mounted on the strut 5. One end of the rod 270 is housed in the elongated hole 40. The interior surface of the hole 40 then forms a cam profile, while the rod 270 acts as a follower. In practice, the rod 39 is mobile relative to the rod 270. In a variant not shown, the rod 270 is substituted by a separate support mounted on the strut 5.

As regards the pulley 22, it is mounted on a rod 24 or a pivot rotatably mounted on the intermediate beam 13. The rod 24 can rotate around its own axis 26 and can follow a circular arc trajectory 47 around the second folding hinge (see FIG. 5).

Figures 3, 4:
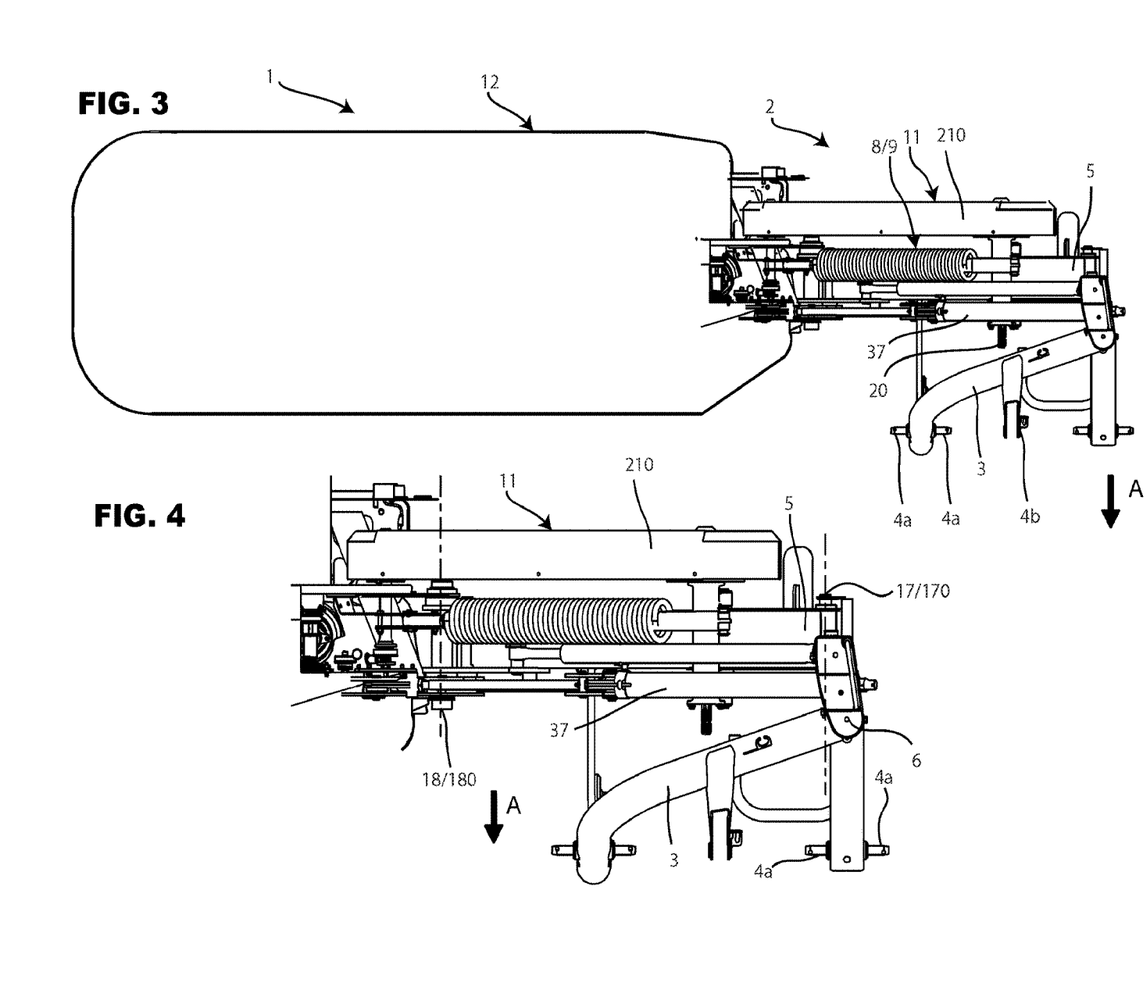
FIG. 3 is a top view of the agricultural machine in FIG. 1.
FIG. 4 is an enlargement of the connecting structure as shown in FIG. 3.

The transmission unit 11 preferably includes a protective hood 210 (FIG. 3).

Figure 9:
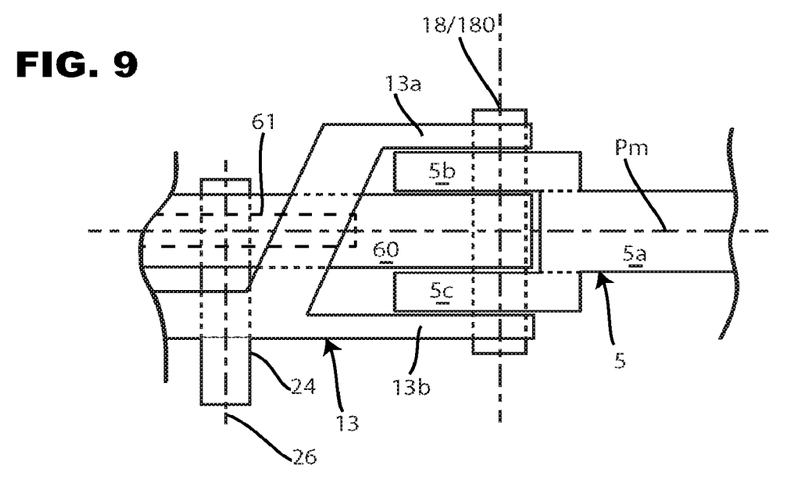
FIG. 9 is a simplified example, from an underside view, of the folding hinge between the connecting structure and the work unit.

FIG. 9 shows in detail an underside view of a possible arrangement between the intermediate beam 13 and a housing 60 of the work unit 12, and the strut 5.

The strut 5 can include a main portion 5a at the end of which two flanges 5b and 5c are fastened.

The housing 60 is a housing in which a series of drive pinions 61 are housed, these transmitting the driving force to the tools 15. In the production mode shown, the housing is positioned centred between the flanges 5b and 5c. Just one pinion 61 is shown in FIG. 9, the others being positioned in the housing 60, opposite the hinge 18.

The intermediate beam 13 for its part can include an end fork fitted with branches 13a and 13b.

Here, preferably but not exclusively, the housing 60 can be made from a light material such as aluminium, while the strut 5 and the intermediate beam 13 are made from steel.

The assembly of the beam 13, the housing 60 and the strut 5 can be accomplished as follows:

One of the flanges 5b and 5c is fastened to the main portion 5a, for example by screwing or welding.

The housing 60 is positioned against the flange 5b or 5c that has been fastened to the portion 5a.

The other flange 5b or 5c is fastened against the portion 5a, for example by screwing, the housing 60 then being sandwiched between the flanges 5b and 5c.

The intermediate beam 13 is positioned around the end of the strut 5 with the branches 13a and 13b either side of the flanges 5b and 5c.

The rod of the hinge 18 is inserted into the aligned holes of the parts 5, 13 and 60 to articulate the beam 13 and the housing 60 relative to the strut 5.

The rod 24 may have been mounted in the housing 60 previously at the same time as the series of pinions 61. The rest of the transmission unit 11 can then be placed against the strut 5.

The machine 1 described above has several advantages compared with the prior art. The dissociation of the folding (hinge 18) and driving (rod 24) functions means that the stresses previously exerted on one single hinge can be distributed across two separate rods (the axis of hinge 18 and the rod 24). Thanks to lower stresses, it is possible to make certain parts lighter, for example by manufacturing the housing 60 from aluminium. This saves several tens of kilograms. By mounting the driven pulley 22 on a rod 24 separate from the hinge 18, it is possible to bring the pulley 22 closer to the centre of gravity of the machine 1, through which passes for example a longitudinal plane Pm (FIG. 9). The bending stresses (i.e. the cantilever effect or the lever arm) on the pivot of the pulley 22, and the torsional stresses on the strut 5 are therefore reduced. In addition, it is possible to reduce the number of parts stacked by width and the width of these parts and therefore to make the machine 1 even lighter.

Three vertical planes V1, V2 and V3 are defined to describe the agricultural machine 1 (see FIG. 5).

The vertical plane V1 passes through the rotation axis of the driving pulley 25.

The vertical plane V2 passes through the second folding axis 180.

Figure 7:
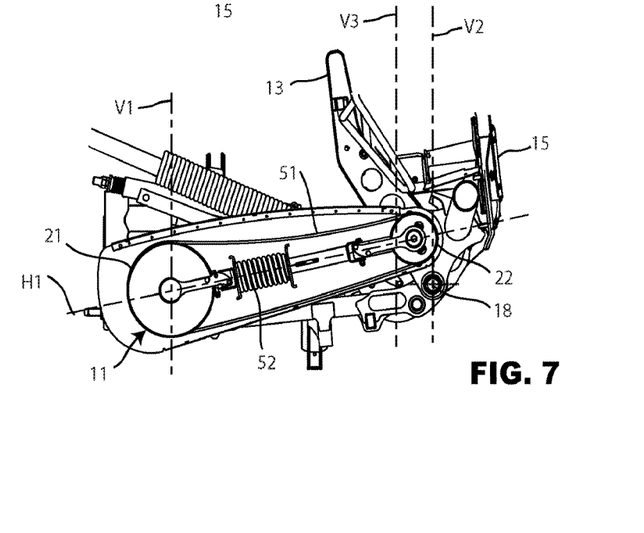
FIG. 7 is a view of the elements in FIG. 5 in a transport position.

The vertical plane V3 passes through the centre of gravity G of the work unit 12 (FIGS. 5 and 7).

The "vertical" description of the planes V1, V2 and V3 is relative to a flat horizontal ground.

Figure 6:
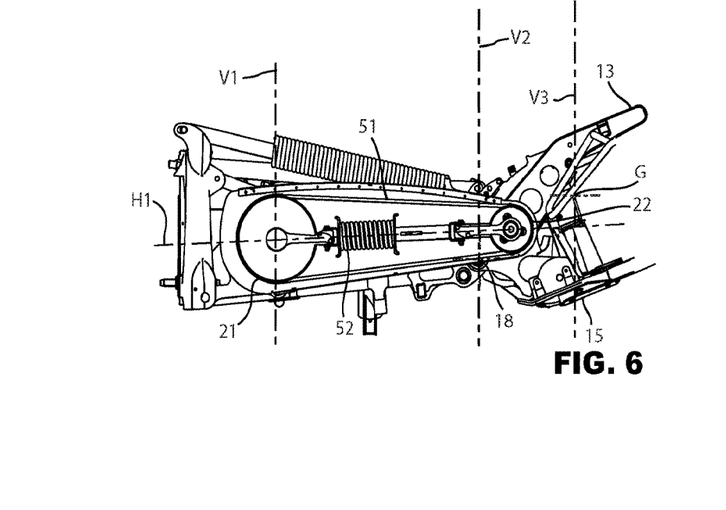
FIG. 6 is a view of the elements in FIG. 5 in a swath pass position.

In the production mode shown in FIGS. 5 to 7:

in the work position and in the intermediate position, the vertical plane V3 is located outside the space between the planes V1 and V2;

in the transport position, the vertical plane V3 is located in the space between the planes V1 and V2.

To transition from the work position (FIG. 5) to the swath pass position (FIG. 6) or to the transport position (FIG. 7), the cylinder 37 is activated.

During work, the work unit 12 is lowered and rests for example on the ground in the case of a blade mower. The work unit 12 and the connecting structure 2 are liable to be displaced to follow the profile of the terrain along the length of the mower unit. The work unit 12 then rotates around the folding axes 170 and 180. During this displacement, the hinge 43 slides in the oblong hole 36 of the lever 35 (FIG. 2).

The transition from the work position to the intermediate position is described below.

The activation of the cylinder 37 initially reduces the play due to the displacement and which remains between the connecting structure 2 and the work unit 12. The retraction of the cylinder 37 causes the boomerang rod 38 to swivel around the hinge 42, and the lever 35 to swivel around its hitching point 36b. The hinge 43 comes into contact with the stop 36a.

Due to its own weight, the adjustment rod in position 39 normally rests on the rod 270 in the work position and in the intermediate position. The swivelling of the rod 38 therefore causes the rod 39 to slide relative to the rod 270.

In a second stage, while the hinge 43 comes to rest against the stop 36a, the rod 38 continues to swivel around the hinge 42 while the work unit 12 swivels around the folding axis 180, driven by the lever 35. At the end of the second stage, the rod 270 comes into contact with the stop 41c. The swivelling of the work unit 12 around the hinge 18 is then interrupted.

The retraction of the cylinder 37 continues during a third stage during which the work unit 12 and the strut 5 swivel around the first folding axis 170. This movement is interrupted by a mechanical stop that turns off the oil supply to the cylinder 37, keeping it under hydraulic pressure. The machine 1 is then in a swath pass position (FIG. 6).

The transition from the work position to the transport position will now be described.

The transition to the transport position is carried out for example by activating the control 48, which raises the rod 39. The activation of the control 48 can generally occur at any time at the start of the stroke of the cylinder 37, before the surface 41c comes into contact with the rod 270. The potential play clearance stage is identical in principle to that previously described.

During a second stage, the retraction of the cylinder 37 allows the rod 38 to continue to swivel around the hinge 42. The raising of the rod 39 allows the rod 270 to engage in the passage 41a, avoiding the surface 41c. The rod 39 can then continue to slide relative to the rod 270, beyond the stop surface 41c. Because the surface 41c is not stopped by the rod 270, the work unit 12 continues to swivel around the folding axis 180 until it reaches a substantially vertical position, preferably beyond the vertical plane V2 passing through the folding axis 180.

During lifting, the pivots 23 and 24 are moved around the respective hinge 27 and 18. The pivot 23 then follows the circular arc trajectory 46 and the pivot 24 the trajectory 47 (FIG. 5). The pivot 23 comes to rest against the cradle 50 (FIG. 2). The cylinder 37 continues to retract while the rod of the pivot 23 is held in abutment. The stroke of the pivot 24 continues while the belt 51 slackens. The tensioning system 30 and its compression spring 52 are then compressed. The stroke of the pivot 24 is interrupted while the boomerang rod 38 comes into contact with the stop 49 and the intermediate beam 13 can no longer swivel around the folding axis 180. The strut 5 then swivels around the axis 170. The work unit has then reached the transport position and the transmission element 51 is slackened (FIG. 7). To block the machine in the transport position, it is necessary here to block the cylinder 37 to prevent it from deploying. A bolt is then implemented. The bolt takes for example the form of a hook mounted on the body of the cylinder 37 and is engaged in a pin secured to the rod of the cylinder, for example on the end clevis of the cylinder.

To lower the work unit 12 from the transport position, the bolt is disengaged and the oil-flow circuit of the cylinder 37 is opened. The oil can then escape from the cylinder 37 and the cylinder can lengthen.

In the production mode shown, the strut 5 lowers by swivelling around the folding axis 170. The limiter stops the downward movement of the strut 5.

The energy of the compressed spring 52 pushes the centre of gravity G of the work unit 12 (or the plane V3) beyond the vertical plane V2. The spring 52 therefore helps the work unit 12 move from the transport position to its work position. The tensioning element 52 therefore advantageously acts as an unfolding assistance element in addition to its role as a tensioning element strictly speaking. Once the work unit 12 is beyond the vertical plane V2, its own weight causes it to lower to the work position.

The diameter for the release of oil from the cylinder 37 is chosen to automatically regulate the lowering of the work unit 12 under the action of the work unit's 12 own weight.

It is evident that the invention is not limited to the example embodiment variants described above and shown in the attached figures. Modifications remain possible, particularly concerning the composition or number of the various elements or by substituting technical equivalents, without departing from the scope of protection.

The tensioning system 30 can include an additional roller to tighten the transmission element.

The connecting structure as described above can also be implemented on other types of agricultural machines, such as drum mowers and roadside shredders, in which case the work unit includes tools different to the cutting blades of the mower unit previously described. The shredder tools can for example be teeth mounted on a drum with an axis transverse to the direction of advance A of the machine and be individually mounted on axes parallel to the general axis of the drum.

In addition, the machine can include different elements and hinges for following the terrain and avoiding obstacles (not shown here).

What is claimed as new and desired to be secured by Letters Patent of the United States is:

1. An agricultural machine comprising:
    a connecting structure designed to be hitched to a tractor, the connecting structure including a coupling support, a carrier beam and a transmission unit;
    the transmission unit including a driving pulley, a driven pulley, and a transmission element drive-mounted on the driving and driven pulleys; and
    a work unit including an intermediate beam which swivels vertically relative to the carrier beam around a hinge, the work unit being fitted with a work tool configured to be driven in rotation from the transmission unit, the work tool being driven by pinions housed in a housing,
    wherein the driven pulley is mounted on a pulley rod or a pivot rotatably mounted on the intermediate beam,
    wherein an end of the intermediate beam includes an end fork fitted with first and second branches,
    wherein the carrier beam includes a main portion, and first and second flanges provided at an end of the main portion of the carrier beam,
    wherein an end of the housing is positioned between the first and second flanges,
    wherein the first and second flanges are positioned between the first and second branches,
    wherein a hinge rod of the hinge passes through the first and second branches, the first and second flanges, and the end of the housing, and
    wherein a folding axis of the hinge and a rotation axis of the driven pulley are separate from each other.

2. The agricultural machine according to claim 1, wherein a vertical plane passing through a center of gravity of the work unit is located in a space between vertical planes passing respectively through the rotation axis of the driving pulley and the folding axis of the hinge when the agricultural machine is in a transport position.

3. The agricultural machine according to claim 1, wherein a vertical plane passing through a center of gravity of the work unit is located outside a space between vertical planes passing respectively through the rotation axis of the driving pulley and the folding axis of the hinge when the agricultural machine is in a work position.

4. The agricultural machine according to claim 1, wherein a distance between a rotation axis of the driving pulley and the rotation axis of the driven pulley is shorter in a transport position of the agricultural machine than in at least one of a work position of the agricultural machine or an intermediate position of the agricultural machine.

5. The agricultural machine according to claim 1, wherein the transmission element is slackened in a transport position of the agricultural machine.

6. The agricultural machine according to claim 1, wherein the transmission element is a belt or a chain.

7. The agricultural machine according to claim 1, wherein the folding axis of the hinge is below a plane passing through a rotation axis of the driving pulley and the rotation axis of the driven pulley in a work position of the agricultural machine.

8. The agricultural machine according to claim 1, wherein a transmission element tensioning system is positioned in at least one of a space between the driving and driven pulleys or a space defined by the transmission element.

9. The agricultural machine according to claim 8, wherein the transmission element tensioning system includes a tensioning element that can be at least one of a compression spring, an elastomeric material, an elastic pad, or a cylinder.

10. The agricultural machine according to claim 1, wherein the work unit is a mower unit or a roadside shredder.

11. The agricultural machine according to claim 1, wherein the driven pulley is mounted on the pulley rod, the pulley rod being mounted in the housing.

12. The agricultural machine according to claim 1, wherein a material of the housing is different than a material of the carrier beam and a material of the intermediate beam.

* * * * *